April 23, 1963  G. R. WILKINSON ETAL  3,086,837
METHOD OF STERILIZING
Filed April 25, 1961
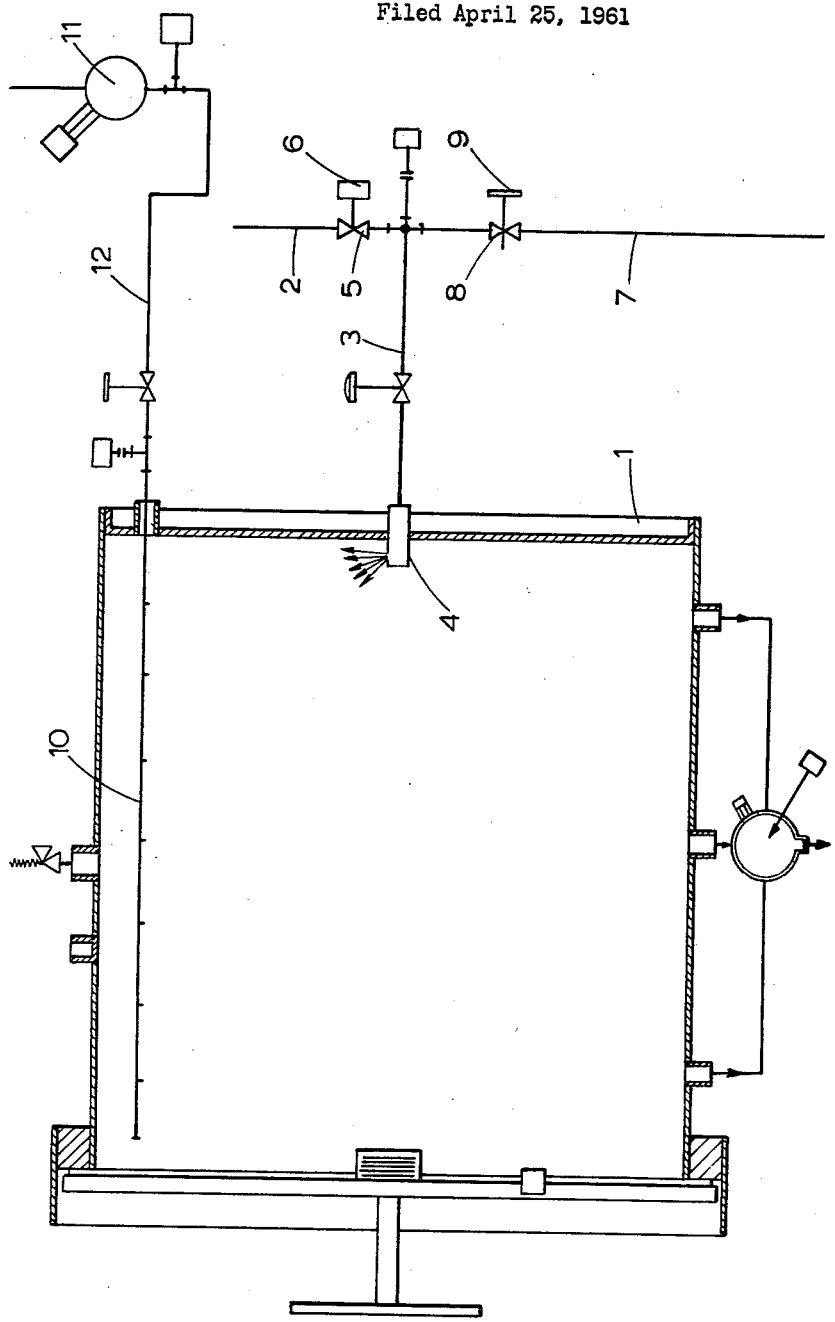
INVENTORS
George Robert Wilkinson
BY  Frank Gerald Peacock
Albert Jacobs
ATTORNEY

3,086,837
METHOD OF STERILIZING
George Robert Wilkinson and Frank Gerald Peacock, both of Bethnal Green, London, England, assignors to Allen & Hanburys Limited, London, England, a British company
Filed Apr. 25, 1961, Ser. No. 105,335
Claims priority, application Great Britain Apr. 26, 1960
2 Claims. (Cl. 21—56)

This invention relates to the sterilising of materials in glass or like fragile containers.

It is well known to sterilise materials such as liquids for parenteral administration by enclosing them in glass or like fragile containers and then placing the containers in a sterilisation chamber, for example an autoclave containing steam under pressure. After sterilisation, considerable time is normally required for large containers and their contents to cool from the sterilising temperature, for example 115° C., to a temperature at which they are safe to handle, for example below the boiling point of water. This protracted cooling period may lead to deterioration in the contents of the containers and accordingly attempts have been made to reduce the time required for cooling by introducing a cooling fluid into the chamber. However, any substantial difference between the temperature of the cooling fluid and the temperature of the containers has hitherto resulted in the breakage of the containers by thermal shock. The reduction in cooling time obtainable by the use of such methods is very limited.

According to the present invention there is provided a method of sterilising materials in glass or like fragile containers which method comprises the steps of heating a closed glass or like fragile container and its contents in a sterilising chamber at 100° to 150° C., and then cooling the container and its contents, while still in the chamber, by introducing an aqueous cooling liquid at a temperature of below 90° C., into the chamber in the form of a mist consisting of droplets having a mean particle size of between 1 micron and 500 microns.

The use of a cooling mist consisting of droplets having a mean particle size of between 1 micron and 500 microns enables the temperature of the cooling liquid to be substantially lower than the temperature of the containers without causing damage to the containers. Preferably the mean particle size of the droplets is between 50 and 100 microns.

The chamber may be heated by saturated steam and, in order to prevent a vacuum in the chamber due to the condensation of the steam by the cooling liquid, compressed air or other gas is preferably introduced into the chamber concurrently with the cooling liquid.

The cooling liquid is preferably water and may be mains water at room temperature.

The use of this method permits the removal of the containers from the autoclave more quickly after the sterilisation operation than is possible when traditional methods are used without any additional risk of the containers exploding.

The accompanying drawing illustrates a preferred apparatus for carrying out the invention in which bottles are sterilised in an autoclave sterilising chamber 1 to which steam is supplied through pipes 2, 3 and injected through nozzle 4. Steam can be cut-off from the pipe 3 and autoclave 1 by a control valve 5 operated by a solenoid 6. Compressed air can be supplied to the pipe 3 through a pipe 7 and controlled by a valve 8 actuated by a solenoid 9.

A spray bar 10 is arranged inside the autoclave 1 near the top thereof and is connected to a water-supply pump 11 by a pipe 12. The spray bar has nozzles capable of distributing water in the form of a mist consisting of droplets having a mean particle size of between 1 micron and 500 microns.

*Example*

400 sealed glass bottles each containing 500 ml. of saline solution were placed in the autoclave 1 and subjected to a steam pressure of 10 lbs. per square inch for thirty minutes. At the end of this period the supply of steam to the autoclave was cut off and mains water under pressure was supplied to the nozzle within the chamber. Compressed air was also supplied to the chamber at the same time. The nozzles were so selected to form droplets of water having a mean particle size of 50 to 100 microns. When the liquid in the bottle had cooled to below its boiling point the air supply was discontinued and further cooling was achieved by the water mist alone. The bottles were cooled from the sterilisation temperature (120° C.) to 90° C., in 30 minutes. In control experiments without mist cooling, the time for cooling the saline solution from the same sterilisation temperature to 90° C. was 22 hours.

What we claim is:

1. In a method of sterilising materials in fragile containers, the steps of heating a closed fragile container and its contents in a sterilising chamber at 100° C. to 150° C., cooling said container and its contents, while still in said chamber by introducing an aqueous cooling liquid at a temperature of below 90° C. into the chamber in the form of a mist consisting of droplets having a mean particle size of between 1 micron and 500 microns.

2. In a method of sterilising materials in glass containers, the steps of heating a closed container and its contents in a sterilising chamber at 100° C. to 150° C., said chamber being heated by the application of saturated steam; and then cooling said container and its contents by introducing cooling liquid into said chamber at a temperature of below 90° C., said cooling liquid being introduced in the form of a mist consisting of droplets having a mean particle size between 1 micron and 500 microns and being introduced concurrently with a compressed gas.

References Cited in the file of this patent

UNITED STATES PATENTS

| | | |
|---|---|---|
| 1,693,995 | Williams | Dec. 4, 1928 |
| 1,894,813 | Zarotschenzeff | Jan. 17, 1933 |
| 2,131,131 | Zarotschenzeff | Sept. 27, 1938 |
| 2,488,997 | Thornburg | Nov. 22, 1949 |
| 2,713,702 | Jewell | July 26, 1955 |